United States Patent
Hu et al.

(10) Patent No.: US 9,342,245 B2
(45) Date of Patent: May 17, 2016

(54) METHOD AND SYSTEM FOR ALLOCATING A RESOURCE OF A STORAGE DEVICE TO A STORAGE OPTIMIZATION OPERATION

(71) Applicant: International Business Machines Corporation, Armonk, NY (US)

(72) Inventors: Xiaoyu Hu, Horgen (CH); Nikolas Ioannou, Zürich (CH); Ioannis Koltsidas, Zürich (CH); Yang Liu, Shanghai (CN); Mei Mei, Shanghai (CN); Paul H. Muench, San Jose, CA (US); Roman A. Pletka, Uster (CH); ZhiQiang Wang, Shanghai (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 111 days.

(21) Appl. No.: 14/472,426

(22) Filed: Aug. 29, 2014

(65) Prior Publication Data
US 2015/0067294 A1    Mar. 5, 2015

(30) Foreign Application Priority Data

Aug. 30, 2013   (CN) .......................... 2013 1 0386111

(51) Int. Cl.
*G06F 12/02*  (2006.01)
*G06F 3/06*   (2006.01)

(52) U.S. Cl.
CPC .............. *G06F 3/061* (2013.01); *G06F 3/0631* (2013.01); *G06F 3/0653* (2013.01); *G06F 3/0673* (2013.01); *G06F 3/0676* (2013.01)

(58) Field of Classification Search
CPC ...... G06F 3/061; G06F 3/0631; G06F 3/0653; G06F 3/0673; G06F 3/0676; G06F 3/068; G06F 3/0611; G06F 3/0617
See application file for complete search history.

(56) References Cited

U.S. PATENT DOCUMENTS

| | | | |
|---|---|---|---|
| 7,017,023 B1* | 3/2006 | Knight | H04L 41/0866 707/999.102 |
| 8,255,660 B1 | 8/2012 | Chatterjee et al. | |
| 9,047,017 B1* | 6/2015 | Dolan | G06F 3/0653 711/154 |
| 2006/0161753 A1* | 7/2006 | Aschoff | G06F 3/0613 711/170 |
| 2012/0221787 A1 | 8/2012 | Fuente et al. | |
| 2013/0036091 A1 | 2/2013 | Provenzano et al. | |

FOREIGN PATENT DOCUMENTS

WO    2009073013 A1    6/2009

OTHER PUBLICATIONS

Graham et al., "CIO Challenge: Performance vs. Cost: The Data Temperature Spectrum," Data Warehousing, p. 1-10, Teradata.

(Continued)

*Primary Examiner* — Hiep Nguyen
(74) *Attorney, Agent, or Firm* — Yuanmin Cai; Andrew M. Calderon; Roberts Mlotkowski Safran & Cole, P.C.

(57) ABSTRACT

Allocating a resource of a storage device to a storage optimization operation. An available resource of the storage device is monitored. Determining an allocation proportion of the resource allocated to the storage optimization operation, based on at least one of historical running information and a predicted value of a performance improvement caused by the storage optimization operation. Allocating the resource of the storage device to the storage optimization operation based on the available resource and the allocation proportion.

20 Claims, 5 Drawing Sheets

(56) References Cited

OTHER PUBLICATIONS

Hu et al, "Method and System for Allocating a Resource of a Storage Device to a Storage Optimization Operation," Filed on Aug. 30, 2013, p. 1-34, CN Patent Application No. 201310386111.6.

IBM, "Data management using multi-temperature storage," DB2 Version 10.1 for Linux, UNIX, and Windows, p. 1-3, IBM Knowledge Center, http://www-01.ibm.com/support/knowledgecenter/api/content/SSEPGG_10.1.0/com.ibm.db2.luw.admin.dbobj.doc/doc/c0059106.html, Accessed on: Aug. 28, 2014.

* cited by examiner

METHOD AND SYSTEM FOR ALLOCATING A RESOURCE OF A STORAGE DEVICE TO A STORAGE OPTIMIZATION OPERATION

CROSS-REFERENCE TO RELATED APPLICATIONS

This application claims the benefit of priority from Chinese Patent Application Number 201310386111.6, filed Aug. 30, 2013, which is hereby incorporated by reference in its entirety.

BACKGROUND

The present invention relates to data storage optimization, and more particularly to allocating a resource of a storage device to a storage optimization operation.

A storage device with a hierarchical storage architecture is often built for use by one or more hosts to store data so as to achieve a balance between storage cost and storage performance. Specifically, the hierarchical storage architecture can be formed by using storage system with different performances and costs. The storage systems can be mechanical hard disks (HDDs), flash-based solid state disks (SSDs) and so on, which have different performance characteristics (e.g., rotating speeds). For example, a 15,000 rpm HDD, a 7,200 rpm HDD, and an SSD can be used to build a 3-layer storage architecture. In order to improve usage efficiency of the storage device and reduce usage cost, it is often necessary to perform a hierarchical storage optimization operation on data stored therein, i.e., to transfer data stored in a certain storage layer to another storage layer according to characteristics of the data. For example, data which are frequently accessed (i.e., hot data) can be transferred from an HDD which has a slower access speed to an SSD which is more expensive but has a faster access speed so as to increase the access speed of the data, while idle data or data which are accessed less frequently (i.e., cold data) can be transferred from the SSD to the HDD which has a slower access speed but is cheaper so as to reduce the storage cost. This hierarchical storage optimization operation consumes resources of the storage device, such as a bandwidth, etc., and thus will affect customer workload which runs on the storage device and also needs to consume resources.

Another trend in data storage is to connect a high-speed-flash-based Direct Attached Storage (DAS) device to the host. The DAS device is used as a cache memory to store data in order to reduce data access delay. In this case, a cache storage optimization operation is required. Specifically, when a customer of the host issues a data read request, but the request does not hit (i.e., the data does not exist in the cache memory), the host reads the requested data from the storage device described above and supplies it to the customer. In order to increase the hit rate of subsequent data read requests, the host populates the data from the storage device into the cache memory, that is to say, the optimization operation is performed asynchronously. However, the storage capacity of the DAS device is usually large. Thus during warm-up of the DAS device or during its customer workload transition, this cache storage optimization operation will impose a great burden on the storage device, thereby affecting the customer workload running on the storage device.

A way to allocate resources of the storage device to storage optimization operations executed by the host and/or the storage device are needed, so as to allow the storage optimization operations to be performed on the host and/or storage device to improve its performance, while imposing a small impact on the normal customer workload of the storage device.

SUMMARY

An objective of the present invention is to provide a method, system, and computer program product for allocating a resource of a storage device to a storage optimization operation, which may allow the storage optimization operation to be performed to improve performance, while imposing a small short-term impact on normal customer workload running on the storage device.

Embodiments of the present invention disclose a method, computer program product, and system for allocating a resource of a storage device to a storage optimization operation. An available resource of the storage device is monitored. Determining an allocation proportion of the resource allocated to the storage optimization operation, based on at least one of historical running information and a predicted value of a performance improvement caused by the storage optimization operation. Allocating the resource of the storage device to the storage optimization operation based on the available resource and the allocation proportion.

BRIEF DESCRIPTION OF THE SEVERAL VIEWS OF THE DRAWINGS

Through more detailed descriptions of some embodiments of the present disclosure in the accompanying drawings, the above and other objects, features, and advantages of the present disclosure will become more apparent.

DETAILED DESCRIPTION

Figure 1:
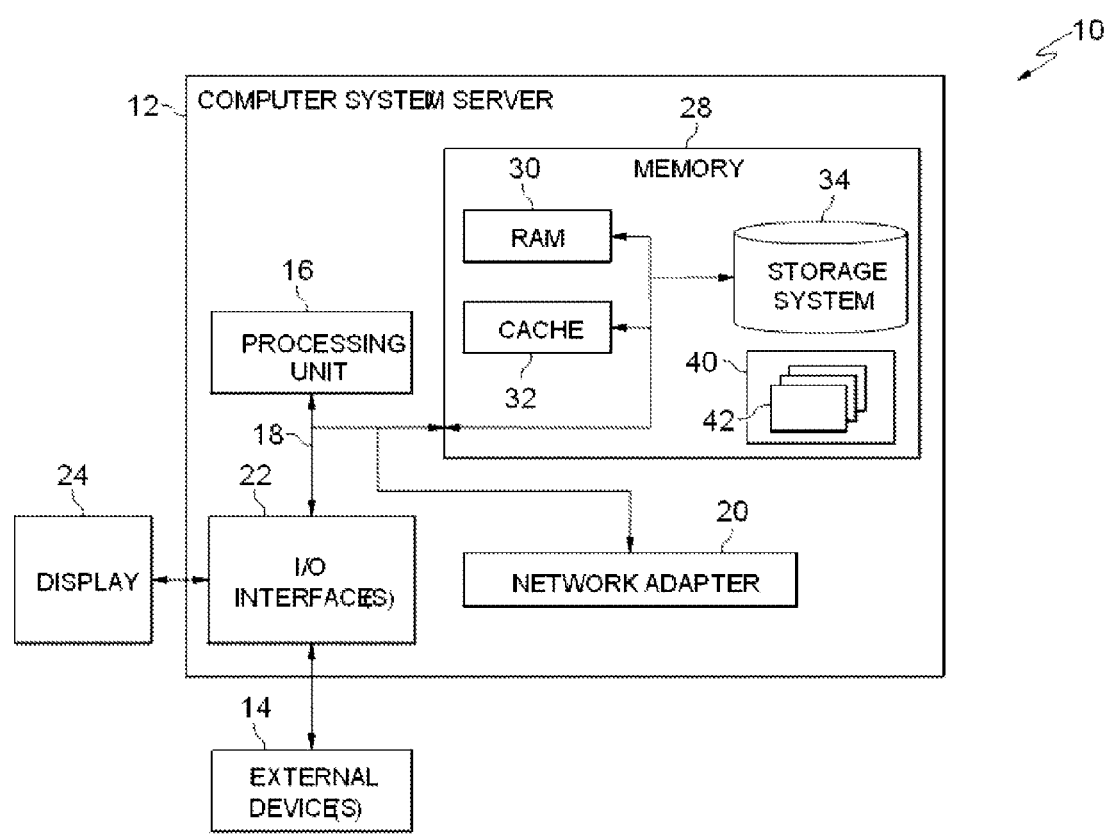
FIG. 1 shows a block diagram of an exemplary computer system 10, in accordance with embodiments of the present invention.

Exemplary embodiments will be described in more detail with reference to the accompanying drawings, in which the exemplary embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an exemplary computer system/server 12 which is applicable to implement various embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer readable storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It is to be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
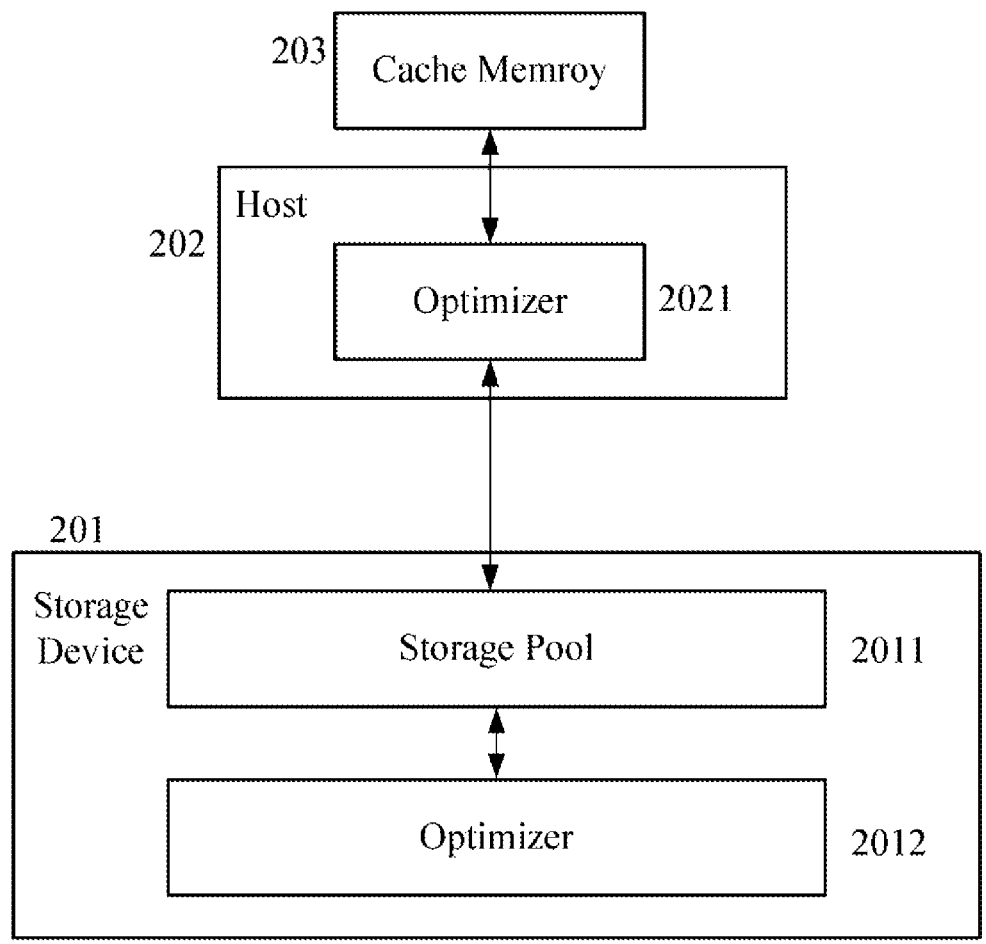
FIG. 2 shows an exemplary application environment in accordance with embodiments of the present invention.

As shown in FIG. 2, a storage device 201 includes a storage pool 2011 and an optimizer 2012. As described above, the storage pool 2011 can store data hierarchically by using a hierarchical storage architecture formed by storage systems with different performances. The storage device 201 can act as a storage server, and provide a data storage service for one or more customers (e.g., a host connected to the storage device). When receiving a data read request from a customer, the storage device 201 reads the requested data from the storage pool 2011, and returns it to the customer. The optimizer 2012 can perform the hierarchical storage optimization operation described above, i.e., to transfer data stored in the storage pool 2011 among respective storage layers in accordance with characteristics of the data, so as to improve a usage efficiency of the storage pool.

A host 202 can utilize the data storage service provided by the storage device 201, and can provide a data access service for a customer (not shown). A cache memory 203, such as a flash-based DAS device, is connected to the host 202. When receiving a data read request from a customer, the host 202 queries whether the requested data exists in the cache memory 203, and if the requested data exists in the cache memory 203, that is, the data read request hits, the host 202 reads the data from the cache memory 203 and returns it to the customer. If the requested data does not exist in the cache memory 203, that is, the data read request does not hit, the host 202 reads the requested data from the storage device 201 and returns it to the customer. The host 202 includes an optimizer 2021 for performing the cache storage optimization operation described above, that is, when the requested data does not exist in the cache memory 203, the host 202 reads the requested data from the storage device 201 and returns it to the customer. The optimizer 2021 then populates the data into the cache memory 203 for use by subsequent data read requests so as to improve a hit rate thereof.

The storage optimization operations executed in the storage device 201 and the host 202 will consume resources of the storage device 201. In order to avoid the storage optimization operations consuming resources such that the normal customer workload of the storage device 201 is affected, various embodiments of the present invention can be used to allocate the resources reasonably for the storage optimization operation. Although FIG. 2 shows that only one host is connected to the storage device 201, this is illustrative only, and multiple hosts can be connected to the storage device 201 to use the data storage service provided by the storage device 201, or there may be no host connected to the storage device 201. In addition, although it is described above that the storage optimization operations are performed in both of the storage device 201 and the host 202, this is not limitative, and the storage optimization operations can be performed only in the storage device 201 or only in the host 202. In the case where there are multiple hosts, the storage optimization operations can be executed in a part or all of these hosts.

The method for allocating a resource of a storage device to a storage optimization operation executed by a machine according to an embodiment of the present invention will be described with reference to FIGS. 2 and 3. The machine can be at least one of the storage device 201 and the host 202 described above. The description is made by using as an example the case where the machine is the storage device 201 and the host 202, that is, the storage optimization operations are performed in both of the storage device 201 and the host 202.

Figure 3:
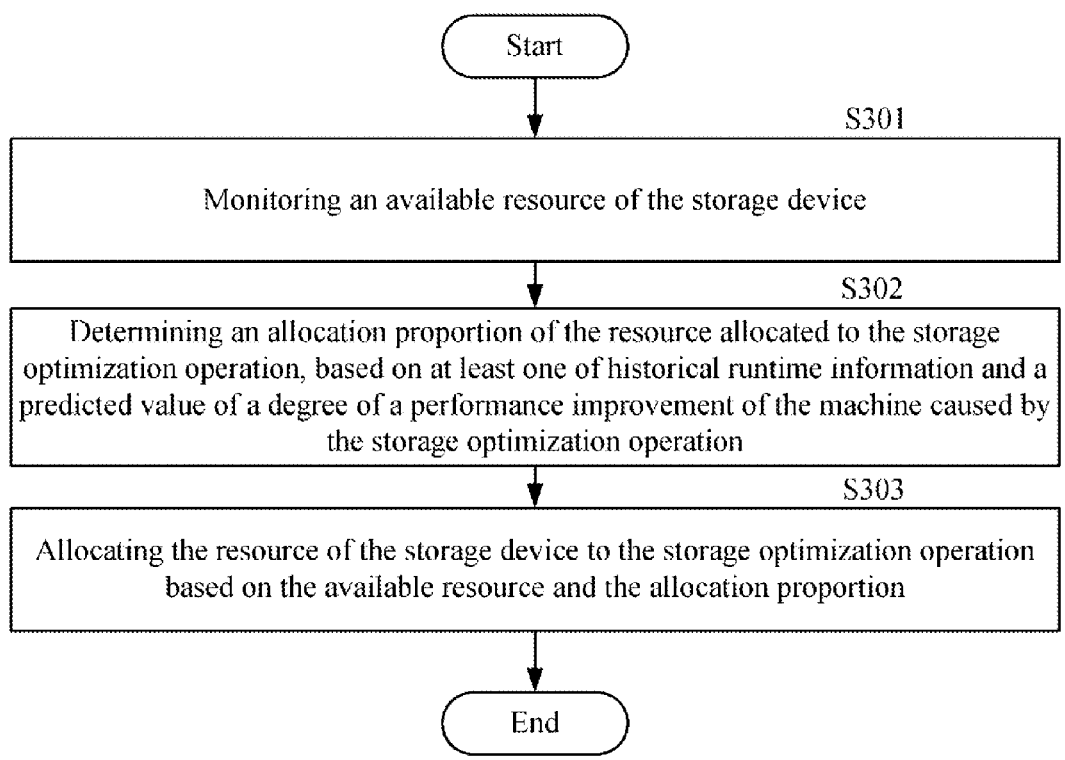
FIG. 3 shows a flowchart of a method for allocating a resource of a storage device to a storage optimization operation executed by a machine in accordance with embodiments of the present invention.

As shown in FIG. 3, in step S301, an available resource of the storage device 201 is monitored.

The storage device 201 may have a variety of resources, such as a storage bandwidth, the number of Input/Output Operations Per Second (IOPS), and so on. These resources can be used for a data access operation and the storage optimization operation executed by a customer of the storage device 201, and a data access operation and the storage optimization operation executed by the storage device 201. Thus, one or more of these resources may become a bottleneck restricting the data access operations and/or the storage optimization operations. In an embodiment of the present invention, at least one resource, which may become the bottleneck of the storage device 201, can be selected as the resource to be allocated. Availability of the resource is monitored, that is, an idle resource amount of this resource is monitored. For example, in the case where the selected resource is the storage bandwidth, an available bandwidth of the storage device 201 can be monitored. This monitoring may be performed, for example, by a monitoring apparatus provided inside or outside the storage device 201 or by monitoring software installed in the storage device 201. The specific method for monitoring the available resource of the storage device 201 is known in the art, and a description thereof is omitted here.

In step S302, an allocation proportion of the resource allocated to the storage optimization operations is determined based on at least one of historical running information of the storage device 201 and the host 202 and predicted values of performance improvements of the storage device 201 and the host 202 caused by the storage optimization operations.

As mentioned above, when a customer requests data from or writes data to the storage device 201, customer workload is generated on the storage device 201. When the customer requests data from or writes data to the host 202, customer workload is generated on the host 202. Moreover, the storage optimization operations are further executed on the storage device 201 and the host 202, respectively. There may be resource and/or data competitions between the customer workloads and the storage optimization operations. Therefore, it is necessary to known conditions of the respective customer workloads and the conditions of the resource competitions of the storage device 201 and the host 202, which can be achieved by determining the historical running information of the storage device 201 and the host 202. The historical running information of the storage device 201 can be determined by the optimizer 2012 shown in FIG. 2, and the historical running information of the host 202 can be determined by the optimizer 2021 shown in FIG. 2.

For the storage device 201, the historical running information may include information indicating the customer workload of the storage device 201 in a past predetermined time period. The customer workload can be determined based on the number of data input/output (I/O) operations executed on the storage device 201 in the past predetermined time period. Specifically, the storage device 201, as described above, includes the storage pool 2011 which has a plurality of storage layers, each storage layer having one or more storage systems. In the past predetermined time period, the customer may access data in the respective storage layers, so as to perform corresponding data I/O operations (hereinafter referred to as customer workload data I/O operations) in each of the layers. In addition, in the past predetermined time period, a hierarchical storage optimization operation may have been performed in the storage device 201, so that data were transferred among the respective storage layers, thereby corresponding data I/O operations (hereinafter referred to as hierarchical storage optimization data I/O operations) were performed. Therefore, numbers of the customer workload data I/O operations and the hierarchical storage optimization data I/O operations executed in each storage layer in the past predetermined time period can be determined. It may be determined whether a data I/O operation is the customer workload data I/O operation or the hierarchical storage optimization data I/O operation in accordance with an initiator of a data request triggering the data I/O operation. For example, if the data request comes from outside of the storage device 201, it is likely initiated by a customer of the storage device 201, thus the corresponding data I/O operation is the customer workload data I/O operation; on the other hand, if the data request comes from inside of the storage device 201, it is initiated by the storage device 201, and thus the corresponding data I/O operation is the hierarchical storage optimization data I/O operation. Thus, the proportion of all of the customer workload data I/O operations executed in the storage device 201 in the past predetermined time period to a maximum data I/O operation processing capability (i.e., a maximum number of data I/O operations that can be processed) of the storage device 201 can be used as an indicator for measuring its customer workload. The historical running information may further include response time of a data read request corresponding to each of the data I/O operations, i.e., time from receipt of the data read request triggering the data I/O operation to return of the requested data. Each time a data I/O operation is executed, information related to the data I/O operation, such as an initiator of the corresponding data read request, the number of data I/O operations, the response time of the request, etc., can be recorded in the storage device 201, so that the above historical running information can be determined based on the recorded information.

For the storage device 201, the historical running information may further include conflict information indicating the degree of data I/O conflicts which occur between the customer workload of the storage device 201 and the storage optimization operations in a past predetermined time period. Specifically, when data at which the customer workload data I/O operation is directed at overlap with data at which the hierarchical storage optimization data I/O operation is directed, a data I/O conflict occurs between the customer workload and the storage optimization operation. The proportion of the data I/O conflicts to all the data I/O operations executed in the storage device 201 in the past predetermined time period, i.e., a conflict I/O proportion, can be used to indicate the degree of the data I/O conflicts. Each time a data I/O conflict occurs, information related to the data I/O conflict, such as the number of data I/O conflicts, an occurrence scenario of the conflict, etc., can be recorded in the storage device 201, so that the conflict information can be determined based on the recorded information.

For the host 202, the historical running information may also include information indicating the customer workload of the host 202 in a past predetermined time period. The customer workload can be determined based on the number of data I/O operations executed on the host 202 in the past predetermined time period. Specifically, in the past predetermined time period, the customer may access data in the host 202, so as to perform corresponding data I/O operations (i.e., customer workload data I/O operations). In addition, in the past predetermined time period, a cache storage optimization operation may have been performed in the storage device 201, so that corresponding data I/O operations (hereinafter referred to as cache storage optimization data I/O operations) were performed. Therefore, the number of customer workload data I/O operations and cache storage optimization data I/O operations executed in the past predetermined time period can be determined. It may be determined whether a data I/O operation is a customer workload data I/O operation or a cache storage optimization data I/O operation based on the destination of the data at which the data I/O operation is directed. For example, if the data is sent to a customer of the host 202, the data I/O operation is a customer workload data I/O operation, and if the data is sent to the cache memory 2021, the data I/O operation is a cache storage optimization data I/O operation. Thus, the proportion of the customer workload data I/O operations executed on the host 202 in the past predetermined time period to its maximum data I/O operation processing capability can be used as an indicator for measuring the customer workload. For the host 202, the historical running information may further include a hit rate of data read requests of the customer received by the host 202, i.e., the proportion of the data read requests for which the requested data exist in the cache memory 203 to all the data read requests (hereinafter referred to as cache memory hit rate), response time of the data read requests which hit (i.e., time from receipt of the data read requests to return of the requested data from the cache memory 203 to the customer), and response time of the data read requests which do not hit (i.e., time from receipt of the data read requests to reading the requested data from the storage device 201 and returning them to the customer). Each time a data read request is received and/or a data I/O operation is executed, the host 202 records information related to the data read request and/or the data I/O operation, such as the number data I/O operations executed in the past predetermined time period and the destination of requested data, the number of all the data read requests received in the past predetermined time period, the number of the data read requests which hit, response time of each data read request which hits, and response time of each data read request which does not hit, etc., so that the above historical running information can be determined based on the recorded information.

For the host 202, the historical running information may further include conflict information indicating the degree of data I/O conflicts which occur between the customer workload of the host 202 and the storage optimization operations in a past predetermined time period. Specifically, when data at which to the customer workload data I/O operation is directed overlaps with data at which the cache storage optimization data I/O operation is directed, a data I/O conflict occurs between the customer workload and the cache storage optimization operation. The proportion of data I/O conflicts to all data I/O operations executed in the host 202 in the past predetermined time period, i.e., a conflict I/O proportion, can be used to indicate the degree of the data I/O conflicts. Each time a data I/O conflict occurs, information related to the data I/O conflict, such as the number of data I/O conflicts, an occurrence scenario of the conflict, etc., can be recorded in the host 202, so that the conflict information can be determined based on the recorded information.

In order to reasonably allocate a resource to the storage optimization operations, it is also necessary to determine the performance improvements of storage 201 and the host 202 caused by the storage optimization operations so as to evaluate whether the storage optimization operations will result in improvements. In the embodiment of the present invention, performance improvements can be predicated by predicating the proportion at which the storage optimization operation reduces the response time of the data read request caused by the customer workload.

Specifically, for the storage device 201, the predicted value of the performance improvement can be determined by predicting the proportion at which the hierarchical storage optimization operation reduces the response time of the data read request. For example, the proportion at which the response time is reduced, $P_{storage-rt}$, can be calculated by equation (1):

$$P_{storage-rt} = 1 - \frac{\sum_{t=1}^{N}(p_{io-t-target}RT_t)}{\sum_{t=1}^{N}(p_{io-t}RT_t)} \quad (1)$$

where N is the number of storage layers in the storage pool 2011, $P_{io-t-target}$ is the target value of the proportion of the customer workload data I/O operations of the $t^{th}$ storage layer to the customer workload data I/O operations of all the storage layers, which indicates an optimization target of the hierarchical storage optimization operation, and can be flexibly set according to actual needs, $RT_t$ represents average response time of the data read requests to which to all the customer workload data I/O operations of the $t^{th}$ storage layer in the past predetermined time period correspond, which can be determined by averaging the response time of the respective data read requests determined in the aforesaid manner, $p_{io-t}$ is the proportion of the customer workload data I/O operations of the $t^{th}$ storage layer to the customer workload data I/O operations of all the storage layers in the past predetermined time period, which can be determined by calculating the proportion of customer workload data I/O operations of the $t^{th}$ storage layer to customer workload data I/O operations of all the storage layers in the past predetermined time period. In equation (1), $$\frac{\sum_{t=1}^{N}(p_{io-t-target}RT_t)}{\sum_{t=1}^{N}(p_{io-t}RT_t)}$$

represents the proportion of response time of the data read request for the storage device 201 after the hierarchical storage optimization operation is performed to the optimization target, and response time of the data read request for the storage device 201 before the hierarchical storage optimization operation is performed. Thus, equation (1) can represent determining the proportion at which the response time of the data read request for the storage device 201 is reduced after the hierarchical storage optimization operation is performed. It is to be noted that $P_{storage-rt}$ calculated by equation (1) may be a negative value, which means that the storage optimization operation cannot improve the performance of the storage device 201. In this case, the proportion at which the response time is reduced, $P_{storage-rt}$ should be set to 0.

For the host 202, the predicted value of the performance improvement can be determined by predicting the proportion at which the cache storage optimization operation reduces the response time of the data read request. For example, the proportion at which the response time is reduced, $P_{cache-rt}$ can be calculated by equation (2):

$$P_{cache-rt} = \frac{(CH_t - CH) \times (RT_{storage} - RT_{cache})}{CH_c \times RT_{cache} + (1 - CH_c) \times RT_{storage}} \quad (2)$$

where $CH_t$ is the target value of the cache memory hit rate, which indicates a cache memory hit rate expected to be determined by performing the cache storage optimization operation, and can be set flexibly according to actual needs, $CH_c$ is the cache memory hit rate (i.e., a ratio of the data read requests which hit) in a past predetermined time period, and $1-CH_c$ is the ratio of the data read requests which do not hit in the past predetermined time period, $RT_{storage}$ is an average value of response time of all the data read requests which do not hit in the past predetermined time period, and $RT_{cache}$ is an average value of response time of the data read requests which hit in the past predetermined time period. The numerator part of equation (2) represents the reduction amount of the response time caused by the cache storage optimization operation, and the denominator part thereof represents the response time before the storage optimization operation is performed. Accordingly, equation (2) can represent the proportion at which the response time is reduced due to the execution of the cache storage optimization operation. It is to be noted that, $P_{cache-rt}$ calculated by equation (2) may be a negative value, which means that the storage optimization operation cannot improve the performance of the host 202. In this case, the proportion at which the response time is reduced, $P_{cache-rt}$, should be set to 0.

After the historical running information of the storage device 201 and the host 202, and the predicted values of the performance improvements of the storage device 201 and the host 202 caused by the storage optimization operations executed on them are determined, the allocation proportion of the resource allocated to the storage optimization operations can be determined based on the information. Next, an exemplary method for determining the allocation proportion is described with reference to FIG. 4.

Figure 4:
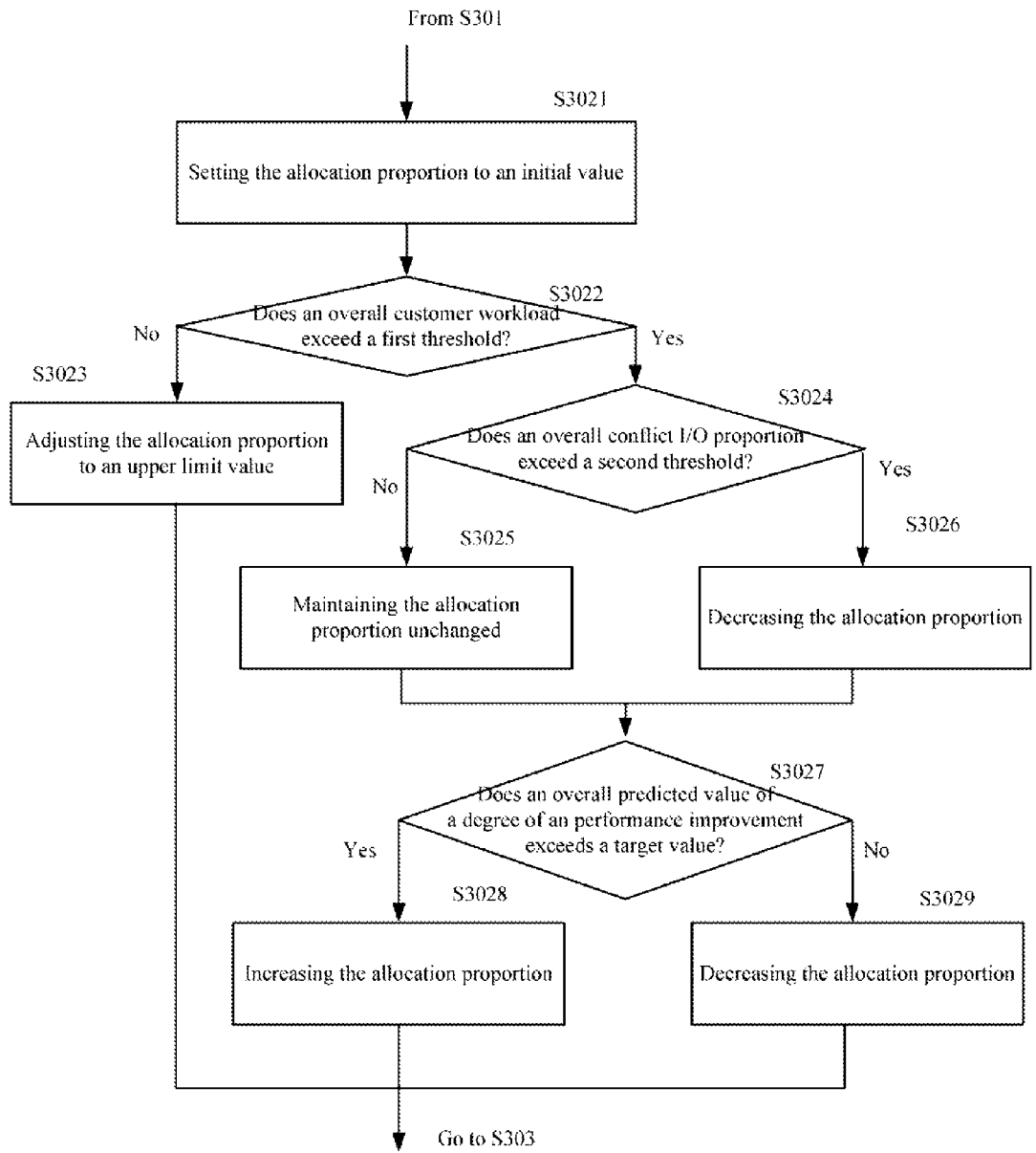
FIG. 4 shows a flowchart of a method for determining an allocation proportion of the resource for the storage optimization operation in accordance with embodiments of the present invention.

As shown in FIG. 4, in step S3021, the allocation proportion is set to an initial value which indicates an initial allocation proportion of the resource of the storage device 201 allocated to the storage resource optimization operation. The initial value can be set by experience or according to various factors such as design requirements. For example, the initial value can be set to 5%.

Next, in step S3022, it is determined whether an overall customer workload of the storage device 201 and the host 202 in the past predetermined time period exceeds a first threshold. The overall customer workload can be a weighted average of the customer workload of the storage device 201 and the customer workload of the host 202. For example, the overall customer workload $wl_{total}$ can be calculated by equation (3):

$$wl_{total} = wl_{storage} s_{storage} + wl_{host} s_{host} \quad (3)$$

where $wl_{storage}$ is the customer workload of the storage device 201 in the past predetermined time period as stated above, $wl_{host}$ is the customer workload of the host 202 in the past predetermined time period as stated above, and $s_{storage}$ and $s_{host}$ are weighting coefficients, in which $s_{storage}$ is the proportion of the customer workload data I/O operations executed by the storage device 201 to all the customer workload data I/O operations executed by the storage device 201 and the host 202 in the past predetermined time period, and $s_{host}$ is the proportion of the customer workload data I/O operations executed by the host 202 to all the customer workload data I/O operations executed by the storage device 201 and the host 202 in the past predetermined time period. The first threshold is a threshold for the customer workload preset according to actual needs, e.g., 40%.

When it is determined in step S3022 that the overall customer workload does not exceed the first threshold, this means that the overall customer workload is low. Thus a large part of the resource of the storage device 201 can be allocated to the storage optimization operation. Therefore, in step S3023, the allocation proportion can be adjusted from the initial value to an upper limit value as a final resource allocation proportion, and the upper limit value indicates a maximum proportion of the resource that can be allocated to the storage optimization operation, and can be set flexibly according to actual conditions of the storage device 201 and the host 202, e.g., it may be set to 30%. Thus, when the customer workload is low, a large part of the resource can be allocated to the storage optimization operation to accelerate execution of the storage optimization operation.

On the other hand, if it is determined in step S3022 that the overall customer workload is higher than the first threshold, the allocation proportion can be further adjusted based on the conflict information of the storage device 201 and the host 202. Specifically, in step S3024, it is determined whether an overall conflict I/O proportion of the storage device 201 and the host 202 in a past predetermined time period exceeds a second threshold. The overall conflict I/O proportion can be the weighted average of the conflict I/O proportion of the storage device 201 and the conflict I/O proportion of the host 202. For example, the overall conflict I/O proportion, $c_{total}$, can be calculated by equation (4):

$$c_{total} = c_{storage} s_{storage} + c_{host} s_{host} \quad (4)$$

where $c_{storage}$ is the conflict I/O proportion of the storage device 201 in the past predetermined time period, $c_{host}$ is the conflict I/O proportion of the host 202 in the past predetermined time period, and $s_{storage}$ and $s_{host}$ are the above weighting coefficients. The second threshold is a value set according to actual needs, which represents an allowable maximum value of the conflict I/O proportion, e.g., 1%.

When it is determined in step S3024 that the overall conflict I/O proportion does not exceed the second threshold, the current allocation proportion remains unchanged in step S3025. On the other hand, when it is determined in step S3024 that the overall conflict I/O proportion is greater than the second threshold, this means that many conflicts occur between the customer workload and the storage optimization operations, therefore in step S3026, the allocation proportion is decreased. For example, the allocation proportion can be decreased in accordance with equation (5):

$$\text{new\_r}_{resource} = \text{cur\_r}_{resource} \times \frac{\text{thres\_conflict\_io\_p}}{\text{cur\_conflict\_io\_p}} \quad (5)$$

where $\text{new\_r}_{resource}$ is the allocation proportion after the decrease, $\text{cur\_r}_{resource}$ is the allocation proportion before the decrease, i.e., the allocation proportion before execution of step S3026, thres_conflict_io_p is the above second threshold, and cur_conflict_io_p is the above overall conflict I/O proportion.

The allocation proportion can be further adjusted based on whether an overall predicted value of the performance improvements of the storage device 201 and the host 202 caused by the storage optimization operations exceeds the target value of the performance improvements. The overall predicted value of the performance improvements may be the weighted average of the predicted value of the performance improvement of the storage device 201 caused by the storage optimization operation and the predicted value of the performance improvement of the host 202 caused by the storage optimization operation as described above. For example, the overall predicted value of the performance improvements can be calculated by equation (6):

$$\text{perf}_{predicted} = \text{perf}_{storage} s_{storage} + \text{perf}_{host} s_{host} \quad (6)$$

where $\text{perf}_{storage}$ is the predicted value of the performance improvement of the storage device 201, $\text{perf}_{host}$ is the predicted value of the performance improvement of the host 202, and $s_{storage}$ and $s_{host}$ are the above weighting coefficients. Specifically, in step S3027, it is determined whether the overall predicted value of the performance improvements exceeds the target value of the performance improvements.

If the overall predicted value of the performance improvements exceeds the target value of the performance improvements, the allocation proportion is increased in step S3028, otherwise the allocation proportion is decreased or maintained in step S3029. Specifically, the allocation proportion may be adjusted (increased or decreased) by using, for example, equation (7):

$$\text{new\_r}_{resource} = \text{cur\_r}_{resource} \times \frac{\text{perf}_{predicted}}{\text{thres\_perf}} \quad (7)$$

where $\text{new\_r}_{resource}$ is the allocation proportion after the adjustment, $\text{cur\_r}_{resource}$ is the allocation proportion before the adjustment, i.e., the allocation proportion before execution of steps S3028 or S3029, thres_perf is a target value of the performance improvements and can be set flexibly as needed. It is to be noted that the allocation proportion calculated by equation (7) may be greater than the aforesaid upper limit value for resource allocation, in which case the allocation proportion should be set to the upper limit value.

With the above method, the allocation proportion of the resource allocated to the storage optimization operations executed on the storage device 201 and the host 202 can be determined based on at least one of the historical running information of the storage device 201 and the host 202 and the predicted values of the performance improvements of the storage device 201 and the host 202 caused by the storage optimization operations executed by them. It is to be noted that although in the above the allocation proportion is adjusted sequentially according to three parameters (i.e., the customer workload, the conflict I/O proportion, and the predicted values of the performance improvements) respectively, this is only illustrative, not limitative, and one or more of the three parameters can be used to adjust the allocation proportion, in which case it is only necessary to perform the steps corresponding to the used parameter(s) among the steps described above with reference to FIG. 4, instead of all the steps.

Returning to FIG. 3, in step S303, the resource of the storage device is allocated to the storage optimization operations based on the available resource of the storage device 201 monitored in step S301 and the allocation proportion of the resource determined in step S302. The resource allocated in step S303 is the overall resource allocated to all the storage optimization operations executed in the storage device 201 and the host 202. The resource can be further allocated to each of the storage optimization operations executed in the storage device 201 and the host 202. In this case, the resource allocated in step S303 can be evenly allocated to the respective storage optimization operations. Alternatively, the resource allocated in step S303 can be allocated to the respective storage optimization operations at corresponding proportions by using the above weighting coefficients $s_{storage}$ and $s_{host}$.

In this way, by using the above method according to the embodiment of the present invention, the resource of the storage device can be allocated reasonably to the storage optimization operations. The storage optimization operations executed in the storage device 201 and the host 202 can be controlled (allowed or prohibited) by, for example, workload controllers (not shown) provided in the storage device 201 and the host 202 respectively in accordance with the resources allocated thereto. Thus, the storage device and the host can be allowed to perform the storage optimization operations to increase their long-term performances, while preventing the storage optimization operations from causing a large impact on the normal customer workload.

The system for allocating a resource of a storage device to a storage optimization operation executed by a machine according to the embodiment of the present invention will be described with reference to FIGS. 2 and 5. The system can perform the above-described method for allocating the resource. Likewise, the machine may be at least one of the storage device 201 and the host 202 which utilizes the data storage service provided by the storage device 201, and hereinafter, the description is made by using as an example the case where the storage optimization operations are performed in both the storage device 201 and the host 202.

Figure 5:
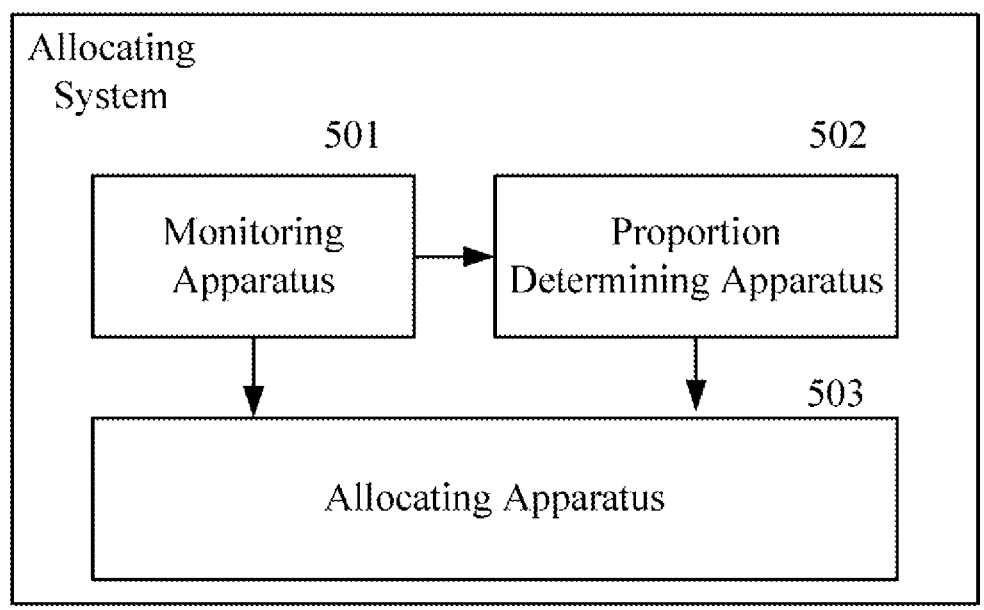
FIG. 5 shows a block diagram of a system for allocating a resource of a storage device to a storage optimization operation executed by a machine in accordance with embodiments of the present invention.

As shown in FIG. 5, the system 500 comprises a monitoring apparatus 501, a proportion determining apparatus 502, and an allocating apparatus 503.

The monitoring apparatus 501 monitors an available resource of the storage device 201. As mentioned above, the storage device 201 may have a variety of resources, for example, a storage bandwidth, TOPS, etc. The monitoring apparatus 501 can monitor availability of at least one of the resources of the storage device 201 which may become a bottleneck, that is, monitor an idle resource amount of the resource.

The proportion determining apparatus 502 determines an allocation proportion of the resource allocated to the storage optimization operations based on at least one of historical running information of the storage device 201 and the host 202 and predicted values of performance improvements of the storage device 201 and the host 202 caused by the storage optimization operations.

Specifically, in order to determine the allocation proportion, the proportion determining apparatus 502 can obtain the historical running information of the storage device 201 and the host 202, so as to learn about respective customer workload conditions and respective resource competition conditions of the storage device 201 and the host 202. This can be implemented by obtaining the historical running information of the storage device 201 and the host 202. As described above, the historical running information of the storage device 201 can be collected by the optimizer 2012 shown in FIG. 2, and the historical running information of the host 202 can be collected by the optimizer 2021 shown in FIG. 2. Correspondingly, the proportion determining apparatus 502 can obtain the historical running information from the optimizers 2012 and 2021. The historical running information is the same as that described above with reference to FIG. 3, thus it is only described briefly hereinafter.

For the storage device 201, the historical running information may include information indicating customer workload of the storage device 201 in a past predetermined time period. The customer workload can be determined based on the number of data input/output (I/O) operations executed in the storage device 201 in the past predetermined time period. Specifically, numbers of customer workload data I/O operations and hierarchical storage optimization data I/O operations executed in each storage layer in the past predetermined time period can be obtained. Thus, a proportion of all the customer workload data I/O operations executed in the storage device 201 in the past predetermined time period to its maximum data I/O operation processing capability can be used as an indicator for measuring its customer workload. Besides the numbers of the data I/O operations, the historical running information may further include response time of a data read request corresponding to each of the data I/O operations. Moreover, the historical running information may further include conflict information indicating a degree of data I/O conflicts which occur between the customer workload of the storage device 201 and the storage optimization operations in a past predetermined time period. A proportion of the data I/O conflicts to all the data I/O operations executed in the storage device 201 in the past predetermined time period, i.e., a conflict I/O proportion, can be used to indicate the degree of the data I/O conflicts.

For the host 202, the historical running information may further include information indicating the customer workload of the host 202 in a past predetermined time period. The customer workload can be determined based on the number of data I/O operations executed on the host 202 in the past predetermined time period. Specifically, numbers of customer workload data I/O operations and cache storage optimization data I/O operations executed in the past predetermined time period can be obtained. Thus, a proportion of all the customer workload data I/O operations executed on the host 202 in the past predetermined time period to its maximum data I/O operation processing capability can be used as an indicator for measuring its customer workload. The historical running information may further include a hit rate of data read requests of the customer received by the host 202 (i.e., cache memory hit rate), response time of the data read requests which hit, and response time of the data read requests which do not hit. Furthermore, the historical running information may further include conflict information indicating a degree of data I/O conflicts which occur between the customer workload of the host 202 and the storage optimization operations in the past predetermined time period. A proportion of the data I/O conflicts to all the data I/O operations executed in the host 202 in the past predetermined time period (i.e., conflict I/O proportion) can be used to indicate the degree of the data I/O conflicts.

Besides determining the historical running information, the proportion determining apparatus 502 also determines the amount of performance improvements of the storage device 201 and the host 202 caused by the storage optimization operations. In the embodiment of the present invention, the proportion determining apparatus 502 predicts the performance improvements by predicating a proportion at which the storage optimization operations reduce the response time of the data read requests caused by customer workload. Specifically, for the storage device 201, the proportion determining apparatus 502 can determine a predicted value of the performance improvement by predicting a proportion at which the hierarchical storage optimization operation reduces the response time of the data read request. For the host 202, the proportion determining apparatus 502 can determine a predicted value of the performance improvement by predicting a proportion at which the cache storage optimization operation reduces the response time of the data read request. The manner in which the proportion determining apparatus 502 performs the prediction is the same as that described above, and a description thereof is omitted here.

Then, the proportion determining apparatus 502 can determine the allocation proportion of the resource allocated to the storage optimization operations based on the historical running information and the predicted values of the degrees of the performance improvements. Since the manner in which the proportion determining apparatus 502 determines the proportion is the same as that described above with reference to FIG. 4, only a brief description of this determining process is made here to avoid repetition, and a description of same details are omitted. Briefly, the proportion determining apparatus 502 firstly sets the allocation proportion to an initial value, and then determines whether an overall customer workload of the storage device 201 and the host 202 in the past predetermined time period exceeds a first threshold. When the overall customer workload does not exceed the first threshold, the proportion determining apparatus 502 can adjust the allocation proportion from the initial value to an upper limit value, as a final resource allocation proportion. On the other hand, if the overall customer workload exceeds the first threshold, the proportion determining apparatus 502 can further adjust the allocation proportion based on the conflict information of the storage device 201 and the host 202. Specifically, the proportion determining apparatus 502 can determine whether an overall conflict I/O proportion of the storage device 201 and the host 202 in the past predetermined time period exceeds a second threshold. When the overall conflict I/O proportion does not exceed the second threshold, the proportion determining apparatus 502 maintains the current allocation proportion unchanged. On the other hand, when the overall conflict I/O proportion is greater than the second threshold, the proportion determining apparatus 502 decreases the allocation proportion. Next, the proportion determining apparatus 502 can further adjust the allocation proportion based on whether an overall predicted value of the degrees of the performance improvements of the storage device 201 and the host 202 caused by the storage optimization operation exceeds a target value of the degrees of the performance improvements. Specifically, if the overall predicted value of the degrees of the performance improvements exceeds the target value of the degrees of the performance improvements, the proportion determining apparatus 502 increases the allocation proportion, otherwise decreases or maintains the allocation proportion. Thus, the allocation proportion of the resource allocated to the storage optimization operations can be ultimately determined through a series of adjustment operations mentioned above. Likewise, in addition to adjusting the allocation proportion sequentially according to above three parameters (i.e., the customer workload, the conflict I/O proportion, and the predicted value of the degrees of the performance improvements), the proportion determining apparatus 502 may also use only one or more of the three parameters to adjust the allocation proportion, in which case it is only necessary to execute operations corresponding to the used parameter(s) among the above operations, instead of all the operations.

The allocating apparatus 503 receives the monitoring result of the available resource obtained by the monitoring apparatus 501 and the allocation proportion of the resource determined by the proportion determining apparatus 502, and then allocates the resource of the storage device to the storage optimization operations based on the available resource and the allocation proportion. Accordingly, the resource can be allocated to the storage optimization operations reasonably.

It is to be noted that the above resource allocated by the allocating apparatus 503 is the overall resource allocated to all the storage optimization operations executed in the storage device 201 and the host 202. The resource can be further allocated to each of the storage optimization operations executed in the storage device 201 and the host 202. For example, the resource allocated by the allocating apparatus 503 can be evenly allocated to the respective storage optimization operations, or can be allocated to the respective storage optimization operations at corresponding proportions by using the above weighting coefficients. Correspondingly, the storage optimization operations executed in the storage device 201 and the host 202 can be controlled (allowed or prohibited) by, for example, workload controllers (not shown) provided in the storage device 201 and the host 202 respectively, in accordance with the resources allocated thereto.

Thus, when the customer workload of the storage device is high, and/or the performance improvements brought by the storage optimization operations are not large, the resource of the storage device allocated to the storage optimization operations can be decreased through the method and apparatus according to the embodiments of the present invention, so as to avoid that a large short-term impact is imposed on the customer workload of the storage device because the storage optimization operations consume too much of the resource of the storage device; on the other hand, when the customer workload of the storage device is low or the storage optimization operations bring great performance improvements, the resource allocated to the storage optimization operations can be increased to improve long-term performances of the host and the storage device while imposing a small impact on the customer workload. Moreover, the above allocation can be performed at a fixed time interval or in response to an instruction of a user, so as to constantly optimize the performances of the host and the storage device.

It is to be noted that the method and system according to the embodiments of the present invention described above are only illustrative, not limitative, and various modifications can be made thereto without departing from the scope of the present invention. For example, although when the method according to the embodiment of the present invention is described in the above, the monitoring operation in step S301 is performed firstly, and then the operation of determining the allocation proportion in step S302 is performed, the order in which the two steps are performed is not limitative, and it is also feasible to perform step S302 firstly, and then perform step S301. In addition, although the embodiments of the present invention are described in accordance with the situation where both the storage device 201 and the host 202 perform the storage optimization operations, the method and system according to the embodiments of the present invention are applicable to the case where one of the storage device 201 and the host 202 performs the storage optimization operation, in which case it is only necessary to replace the respective overall parameters described with reference to FIG. 4 (i.e., the overall customer workload, the overall conflict I/O proportion, and the overall predicted value of the degrees of the performance improvements) with respective parameters of the storage device 201 or the host 202; in other words, the overall customer workload, the overall conflict I/O proportion, and the overall predicted value of the degrees of the performance improvements described above become customer workload, a conflict I/O proportion, and a predicted value of a degree of a performance improvement of the machine which performs the storage optimization operation. Furthermore, the method and system according to the embodiments of the present invention are also applicable to the case where more hosts performs storage optimization operations, in which case it is only necessary to all the hosts which performs the storage optimization operations when the above overall parameters are calculated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for allocating a resource of a storage device to a storage optimization operation, the method comprising:
    monitoring an available resource of the storage device;
    determining an allocation proportion of the resource allocated to the storage optimization operation, based on at least one of historical running information and a predicted value of a performance improvement caused by the storage optimization operation; and
    allocating the resource of the storage device to the storage optimization operation based on the available resource and the allocation proportion.

2. The method of claim 1,
    wherein the historical running information includes information identifying customer workload in a past predetermined time period; and
    wherein determining an allocation proportion further comprises:
        setting the allocation proportion to an initial value; and
        adjusting the allocation proportion from the initial value to an upper limit value in response to the customer workload not exceeding a first threshold.

3. The method of claim 2,
    wherein the historical running information of the machine further includes conflict information identifying a degree of data I/O conflicts which occur between the customer workload and the storage optimization operation in the past predetermined time period; and
    wherein determining an allocation proportion further comprises:
        changing the allocation proportion based on the conflict information in response to the customer workload exceeding the first threshold.

4. The method of claim 3,
    wherein the conflict information includes a proportion of the data I/O conflicts to data I/O operations caused by the customer workload and the storage optimization operation; and
    wherein changing the allocation proportion further comprises:
        decreasing the allocation proportion in response to the proportion exceeding a second threshold; and
        maintaining the allocation proportion unchanged in response to the proportion not exceeding the second threshold.

5. The method of claim 1, wherein determining an allocation proportion further comprises:
    adjusting the allocation proportion according to whether the predicted value of the performance improvement exceeds a target value of the performance improvement caused by the storage optimization operation.

6. The method of claim 5, wherein adjusting the allocation proportion further comprises:
    increasing the allocation proportion, in response to the predicted value of the performance improvement exceeding the target value of the performance improvement; and
    in response to the predicted value of the performance improvement not exceeding the target value of the degree of the performance improvement, performing one of decreasing the allocation proportion, or maintaining the allocation proportion.

7. The method of claim 1, wherein the steps of monitoring, determining, and allocating are each performed by at least one of a host which utilizes a data storage service provided by the storage device and the storage device.

8. A system for allocating a resource of a storage device to a storage optimization operation, the system comprising:
- one or more computer processors, one or more non-transitory computer-readable storage media, and program instructions stored on one or more of the non-transitory computer-readable storage media for execution by at least one of the one or more processors, the program instructions comprising:
- program instructions to monitor an available resource of the storage device;
- program instructions to determine an allocation proportion of the resource allocated to the storage optimization operation, based on at least one of historical running information and a predicted value of a performance improvement caused by the storage optimization operation; and
- program instructions to allocate the resource of the storage device to the storage optimization operation based on the available resource and the allocation proportion.

9. The system of claim 8,
- wherein the historical running information includes information indicating customer workload in a past predetermined time period; and
- wherein the program instructions to determine an allocation proportion further comprise:
  - program instructions to set the allocation proportion to an initial value; and
  - program instructions to adjust the allocation proportion from the initial value to an upper limit value in response to the customer workload not exceeding a first threshold.

10. The system of claim 9,
- wherein the historical running information of the machine further includes conflict information identifying a degree of data I/O conflicts which occur between the customer workload and the storage optimization operation in the past predetermined time period; and
- wherein the program instructions to determine an allocation proportion further comprise:
  - program instructions to change the allocation proportion based on the conflict information in response to the customer workload exceeding the first threshold.

11. The system of claim 10,
- wherein the conflict information includes a proportion of the data I/O conflicts to data I/O operations caused by the customer workload and the storage optimization operation; and
- wherein the program instructions to change the allocation proportion further comprise:
  - program instructions to decrease the allocation proportion in response to the proportion exceeding a second threshold; and
  - program instructions to maintain the allocation proportion unchanged in response to the proportion not exceeding the second threshold.

12. The system of claim 8, wherein the program instructions to determine an allocation proportion further comprise:
- program instructions to adjust the allocation proportion according to whether the predicted value of the performance improvement exceeds a target value of the performance improvement caused by the storage optimization operation.

13. The system of claim 12, wherein the program instructions to adjust the allocation proportion further comprise:
- program instructions to increase the allocation proportion, in response to the predicted value of the performance improvement exceeding the target value of the performance improvement; and
- program instructions, in response to the predicted value of the performance improvement not exceeding the target value of the degree of the performance improvement, to perform one of decreasing the allocation proportion, or maintaining the allocation proportion.

14. The system of claim 8, wherein the program instructions to monitor, determine, and allocate are each executed by one or more computer processors in at least one of a host which utilizes a data storage service provided by the storage device and the storage device.

15. A computer program product for allocating a resource of a storage device to a storage optimization operation, the computer program product comprising:
- one or more non-transitory computer-readable storage media and program instructions stored on the one or more non-transitory computer-readable storage media, the program instructions comprising:
- program instructions to monitor an available resource of the storage device;
- program instructions to determine an allocation proportion of the resource allocated to the storage optimization operation, based on at least one of historical running information and a predicted value of a performance improvement caused by the storage optimization operation; and
- program instructions to allocate the resource of the storage device to the storage optimization operation based on the available resource and the allocation proportion.

16. The computer program product of claim 15,
- wherein the historical running information includes information identifying customer workload in a past predetermined time period; and
- wherein the program instructions to determine an allocation proportion further comprise:
  - program instructions to set the allocation proportion to an initial value; and
  - program instructions to adjust the allocation proportion from the initial value to an upper limit value in response to the customer workload not exceeding a first threshold.

17. The computer program product of claim 16,
- wherein the historical running information of the machine further includes conflict information identifying a degree of data I/O conflicts which occur between the customer workload and the storage optimization operation in the past predetermined time period; and
- wherein the program instructions to determine an allocation proportion further comprise:
  - program instructions to change the allocation proportion based on the conflict information in response to the customer workload exceeding the first threshold.

18. The computer program product of claim 17,
- wherein the conflict information includes a proportion of the data I/O conflicts to data I/O operations caused by the customer workload and the storage optimization operation; and
- wherein the program instructions to change the allocation proportion further comprise:
  - program instructions to decrease the allocation proportion in response to the proportion exceeding a second threshold; and program instructions to maintain the allocation proportion unchanged in response to the proportion not exceeding the second threshold.

19. The computer program product of claim 15, wherein the program instructions to determine an allocation proportion further comprise:

program instructions to adjust the allocation proportion according to whether the predicted value of the performance improvement exceeds a target value of the performance improvement caused by the storage optimization operation.

20. The computer program product of claim 19, wherein the program instructions to adjust the allocation proportion further comprise:

program instructions to increase the allocation proportion, in response to the predicted value of the performance improvement exceeding the target value of the performance improvement; and program instructions, in response to the predicted value of the performance improvement not exceeding the target value of the degree of the performance improvement, to perform one of decreasing the allocation proportion, or maintaining the allocation proportion.

\* \* \* \* \*